(No Model.)

C. HUFFSTETER.
SPRING VEHICLE.

No. 284,206. Patented Sept. 4, 1883.

WITNESSES:
H. J. Schneider.
Walter S. Dodge.

INVENTOR:
Christopher Huffsteter,
by Dodge & Son,
Attys.

UNITED STATES PATENT OFFICE.

CHRISTOPHER HUFFSTETER, OF BENTON HARBOR, MICHIGAN.

SPRING-VEHICLE.

SPECIFICATION forming part of Letters Patent No. 284,206, dated September 4, 1883.

Application filed July 2, 1883. (No model.)

*To all whom it may concern:*

Be it known that I, CHRISTOPHER HUFFSTETER, of Benton Harbor, in the county of Berrien and State of Michigan, have invented certain Improvements in Spring-Vehicles, of which the following is a specification.

My invention relates to spring-vehicles; and the invention consists in the manner of securing the supports to which the springs are attached to the axle, and in providing means for adjusting the same thereon, all as hereinafter more fully set forth.

Figure 1:
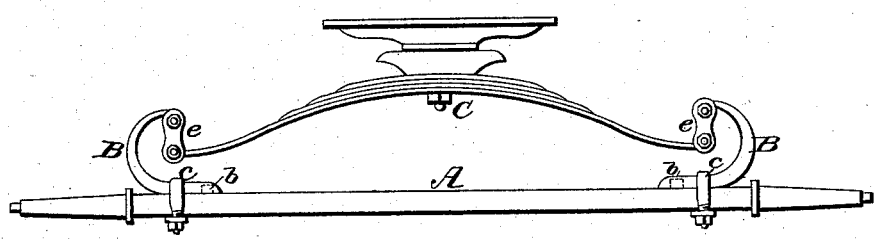
Figure 2:
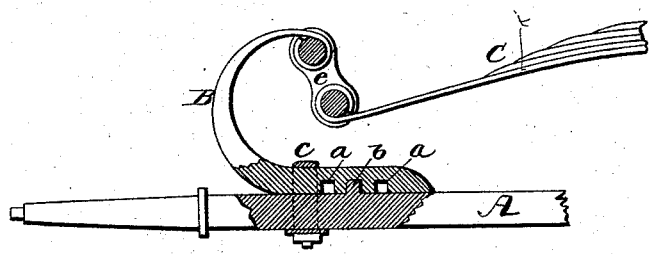

Figure 1 is a front elevation of an axle with a spring attached; and Fig. 2 is an enlarged view of one end of the same, shown partly in section.

In many styles of light wagons and carriages it has long been customary to so apply the springs as to throw the weight upon the axles near their ends, instead of at the center, as such an arrangement possesses advantages which are well understood. When half-springs such as shown in the drawings are used, it is necessary to provide some form of support to which the ends of the spring can be attached, this support generally consisting of a piece of metal bent in the form shown in the drawings, and which is termed a "goose-neck," the same being designated by the letter B, the spring C being connected thereto by a stirrup or shackle, e, as shown in Figs. 1 and 2. These goose-necks or supports B have necessarily to take all the strain incident to the rocking and swaying of the carriage or wagon body in the various directions of its movement, and therefore require to be fastened securely in place upon the axle. At the same time it is desirable to have them so secured that they can be adjusted upon the axle to adapt them to receive springs of different lengths, and for other purposes. Heretofore these supports B have usually been secured to the axle in one of two ways—viz., either by clips or by bolts. When clips alone are used, they are liable to work loose, when the support B will shift its position or become detached, and when bolts are used the axle is greatly weakened by the bolt-holes, which have to be made through it at the points where the weight is thrown upon it, and in such case the axle must necessarily be made much larger and heavier than would otherwise be necessary, in order to impart to it the requisite strength.

To obviate these objections I make the axle A with one or more projections or studs, b, on its upper side, at the point where the supports B are to rest, as shown in Fig. 2. I then make the supports B with a series of holes or recesses, a, of a size to fit upon the studs b, as shown clearly in Fig. 2 and in dotted lines in Fig. 1. When thus constructed, the support B is placed upon the axle with the stud b resting in one of the recesses a, and a clip, c, is then put around the axle and support, as shown in Figs. 1 and 2, by which the support is securely fastened in place upon the axle without in any manner weakening the latter or increasing its size. If a single stud b be used, then by placing the clip c a short distance from the stud, as represented in the drawings, it will be seen that the support is held secure against any lateral or twisting movement upon the axle, and at the same time the stud prevents any end movement of the same. It may be rendered still more secure by providing two studs, b, for each support at some little distance apart, in which case the clip c will be applied midway between them. For light vehicles one stud will be sufficient; but in the heavier vehicles two or even more may be used.

By making a series of the recesses a in the supports the latter can be adjusted or moved longitudinally upon the axle, as desired, to adapt them to springs of different lengths, &c., and when the clip is screwed up tight they will be held securely in place, and any sliding or moving of the support upon the axle will be rendered impossible. The studs b will preferably be formed solid on the axles, either by welding or by forging them thereon by means of a suitable die, as may be found most convenient, and they, together with the recesses, may be round, rectangular, or oblong, as may be preferred. By this improvement I am enabled to fasten the support to the axle in such a manner as to render it secure and prevent any accidental movement of the same thereon, and that, too, without weakening the axle or increasing its size and weight, and at the same time it enables the support to be adjusted as may be required.

Having thus described my invention, what I claim is—

1. The herein-described method of securing spring-supports to axles by means of one or more studs, $b$, formed upon the axle, and corresponding recesses, $a$, formed in the support B, substantially as set forth.

2. In combination with the axle A, provided with one or more studs, $b$, the spring-support B, provided with corresponding recesses, $a$, and clip $c$, all arranged to operate substantially as shown and described.

CHRISTOPHER HUFFSTETER.

Witnesses:
JNO. A. EASTMAN,
W. E. PLIMPTON.